United States Patent

[11] 3,633,893

[72] Inventor Robert H. B. Forster
       Tadworth, England
[21] Appl. No. 29,537
[22] Filed Apr. 17, 1970
[45] Patented Jan. 11, 1972
[73] Assignee The British Oxygen Company Limited
       London, England
[32] Priority Apr. 24, 1969
[33] Great Britain
[31] 20,989/69

[54] METHOD OF OPERATING A REFRACTORY REGENERATIVE FURNACE
2 Claims, 2 Drawing Figs.

[52] U.S. Cl. .................................................. 263/52
[51] Int. Cl. .................................................. F27b 1/22
[50] Field of Search .................................. 263/19 R, 52

[56] References Cited
UNITED STATES PATENTS
2,313,157  3/1943  Linder ......................... 263/19

Primary Examiner—John J. Camby
Attorney—Townshend & Meserole

ABSTRACT: A method of operating a refractory regenerative furnace having a combustion chamber located between two heat-regenerative masses and a baffle means located in the combustion chamber, wherein the greater part of the fuel for combustion is introduced into the combustion chamber upstream of the baffle means.

INVENTOR
ROBERT H. B. FORSTER

BY Townshend & Yesende
ATTORNEYS

METHOD OF OPERATING A REFRACTORY REGENERATIVE FURNACE

FIELD OF THE INVENTION

The invention relates to a refractory regenerative furnace for endothermically altering an endothermically alterable gaseous material.

DESCRIPTION OF THE PRIOR ART

Refractory regenerative furnaces for endothermically altering endothermically alterable gaseous materials are well known. Once conventional type of regenerative furnace which is widely used comprises two heat-regenerative masses arranged on either side of a reaction chamber. The heat-regenerative masses generally consist of a plurality of rectangular blocks of heat-resisting material stacked in face-to-face relationship in abutting rows consisting of superimposed tiers of blocks. The opposed faces of the blocks are provided with grooves extending thereacross so that in the final assembly, grooves of adjacent faces lie in registry to define a plurality of flue passageways which extend through the mass.

The reaction chamber is provided with a central stack which divides the reaction chamber into two separate combustion chambers. The central stack is of similar construction to the heat-regenerative masses and like each heat-regenerative mass has a plurality of flue passageways extending therethrough.

In operation, the furnace is first heated by burning fuel in one of the combustion chambers in order to attain a temperature in the furnace at which the endothermic reaction will occur. Fuel is introduced into one of the combustion chambers by means of burners arranged, facing each other, on opposite sides of each combustion chamber. Air for combustion is introduced at one end of the furnace taking up heat from one of the heat-regenerative masses as it proceeds towards the combustion chamber. Combustion occurs in the region of the combustion chamber after which the combustion products pass through the central stack and the other heat-regenerative mass thereby imparting heat to them.

Heating is continued for a predetermined time after which the endothermic alteration is initiated by passing the endothermically alterable gaseous material through the furnace in the same direction as the combustion air and products. The gaseous material takes up heat from the first heat-regenerative mass causing the endothermic alteration to occur in the region of the combustion chamber. It then passes through the central stack and other combustion chamber and is gradually quenched as it passes through the second heat-regenerative mass which is thereby heated. The endothermic alteration reaction is allowed to proceed for a predetermined interval after which the furnace is again heated, this time by burning fuel in the other combustion chamber and feeding combustion air into the furnace in the opposite direction. The endothermic alteration reaction which follows is also carried out in the opposite direction.

By reversing the direction of flow of the combustion products and endothermically alterable gaseous material at predetermined intervals, a continuous cyclic regenerative process for endothermically altering the endothermically alterable gaseous material can be carried out.

Generally, furnaces are arranged in pairs, one furnace being heated by burning fuel in the combustion chamber while the other is used for effecting the endothermic alteration reaction.

However, for such a process this type of furnace is subject to a number of disadvantages. In general, combustion and heat distribution throughout the furnace is poor. The combustion chambers are too small to provide for adequate mixing of the fuel with the combustion air. Mixing of the fuel and air only effectively occurs in the first combustion chamber, since mixing in the second combustion chamber is virtually prevented by the streamlining effect of the flue passageways in the central stack. Thus, unburnt gases may be swept into the flue passageways in the heat-regenerative masses and in the central stack and an excess of free-oxygen-containing air may be introduced. As a consequence, high-temperature spots tend to develop in certain areas of the furnace and may lead to rapid destruction of the refractory materials of the furnace and damage to the combustion chamber burners. Temperature high spots in the furnace may also lead to carbon formation and solid deposits may be carried far into the flue passageways both in the center stack and in the heat-regenerative masses. Such deposits are difficult to remove and may lead to blockage of the flue passageways. The temperature of the exhaust gases is also liable to be excessively high and may cause expansion problems in the changeover valves which govern the periodic change of direction of gas flow through the furnace.

Our pending application Ser. No. 775,476 dated Nov. 13, 1968 now U.S. No. 3,539,162 of Nov. 10, 1970 describes a refractory regenerative furnace comprising two heat-regenerative masses each having a plurality of flue passageways extending therethrough, and a combustion chamber located between the heat-regenerative masses whereby gaseous material first passes through the flue passageways of one heat-regenerative mass into the combustion chamber and then through the flue passageways of the other heat-regenerative mass, said combustion chamber being provided with baffle means interposed in the path of flow from one heat-regenerative mass to the other whereby a stream of gaseous material passing through the combustion chamber is constrained to flow through an extended path. This furnace will hereinafter be referred to as a furnace of the type described.

Several different constructions of baffle means are disclosed in the copending application but they all have the primary function of providing an extended path for the stream of gaseous material. This extended path imparts turbulence to the flow of the combustibles as they pass through the combustion chamber; this turbulence ensuring efficient mixing of the combustibles thereby providing an improved combustion of the fuel. Although the disclosed furnace has an improved fuel consumption and operational efficiency, in certain circumstances the resultant flame temperature may be sufficiently high to damage the refractories.

SUMMARY OF THE INVENTION

According to the present invention there is provided a method of operating a refractory regenerative furnace having two heat-regenerative masses each having a plurality of flue passageways extending therethrough and a combustion chamber located between the heat-regenerative masses whereby gaseous material first passes through the flue passageways of one heat-regenerative mass and then through the flue passageways of the other heat-regenerative mass, said combustion chamber being provided with baffle means interposed in the path of flow from one heat-regenerative mass to the other whereby a stream of gaseous material passing through the combustion chamber is constrained to flow through an extended path, wherein more than 80 percent by weight of the fuel for combustion is introduced into the combustion chamber upstream of the baffle means and the remainder of the fuel is introduced into the combustion chamber downstream of the baffle means.

For optimum conditions between 85 and 95 percent by weight of the fuel is introduced into the combustion chamber upstream of the baffle means.

The fuel is preferably a gaseous hydrocarbon fuel, for example methane, propane, butane, ethylene, propylene, acetylene or a mixture thereof. In some instances it may be convenient to employ as the fuel a part of any combustible material obtained from the endothermic reaction. For example in the cracking of petroleum naphtha to give a hydrocarbon mixture containing acetylene and ethylene, it may be convenient to reemploy any residual acetylene and ethylene as the fuel.

A refractory regenerative furnace will now be described by way of example with reference to the accompanying drawing in which.

Figure 1:
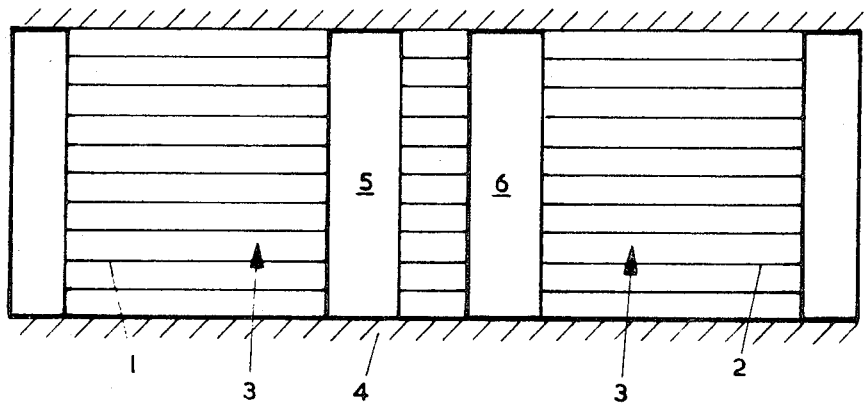
FIG. 1 is a diagrammatic plan of a horizontal section through the furnace.
Figure 2:
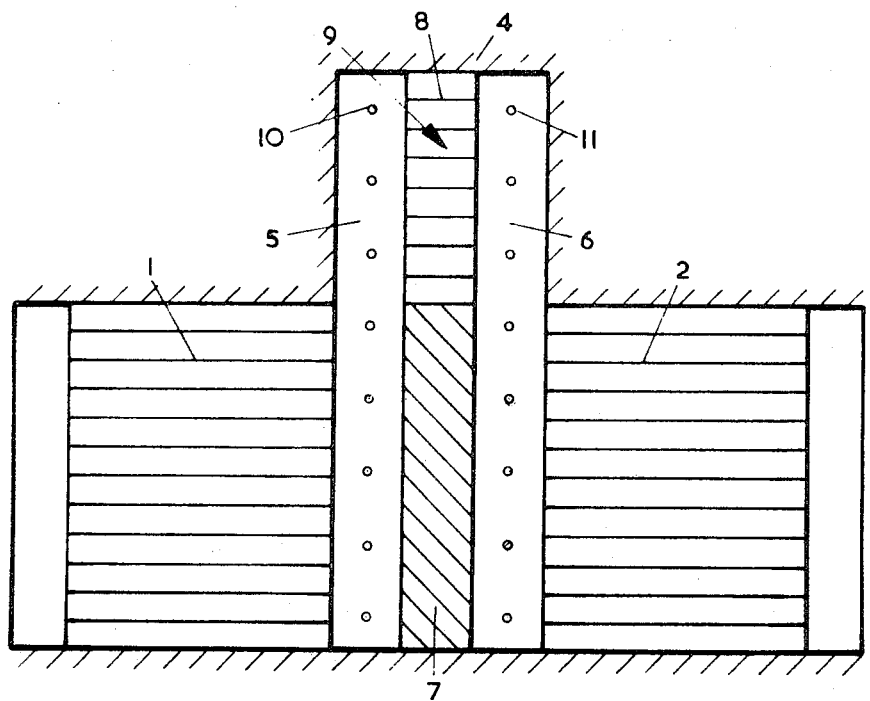
FIG. 2 is a diagrammatic sectional elevation through the furnace.

Referring to the drawing, the furnace comprises two heat-regenerative checkerworks 1 and 2 which are provided with straight uninterrupted flues 3 arranged on either side of a combustion chamber 4. Baffle means extends transversely across the combustion chamber 4 and divides the chamber into two compartments 5 and 6.

The baffle means comprises a lateral dividing wall 7 including an upper checkerwork portion 8 having a plurality of flue passageways 9.

Each compartment 5 and 6 of the combustion chamber is provided with its own set of burners 10 and 11 arranged in vertical rows of eight burners on opposite sides of each compartment. Each set of burners 10 and 11 may be provided with means (not shown) by which they can be water cooled to prevent them from overheating.

The operation of the furnace in a continuous cyclic process for the thermal cracking of petroleum naphtha will now be described. The process consists essentially of a heating cycle followed by an endothermic alteration cycle in which cracking of the petroleum naphtha occurs.

Heating is effected by introducing as a fuel a gaseous hydrocarbon mixture containing ethylene and acetylene. Eighty-eight percent by weight of the fuel is introduced through the lower 12 of the set of burners 10 and the upper four of the set of burners 11. The fuel is ignited and combustion air is drawn through the checkerwork 1. The air and fuel in the compartment 5 form a relatively weak mixture which results in efficient combustion with a comparatively low flame temperature. The heated air rises in the compartment 5 to pass through the flues 9 in the checkerwork 8 to enter the compartment 6. As the already heated gases enter the compartment 6 they are reheated by the remaining 12 percent by weight of the fuel, which is introduced through the upper four burners of the set 11, and are then passed out of the apparatus through the checkerwork 2. This heating cycle proceeds for 60 seconds at the end of which the flow of fuel through the burners is shut off.

Steam is then drawn through the furnace for a period of 3 seconds to purge the combustion air followed by a mixture of steam and vaporized petroleum naphtha which is passed through the furnace for a further period of 57 seconds during which time the endothermic reaction takes place. The gaseous mixture of steam and petroleum naphtha flows through the checkerwork 1 into compartment 5, passes through the flues 9 into the compartment 6, and flows to exhaust through the checkerwork 2. At the completion of the endothermic alteration cycle the furnace reverts to the heating cycle with the combustion air flowing in the reverse direction. Fuel is introduced through the lower 12 burners of the set 11 and the upper four burners of the set 10, is ignited and combustion air is drawn through the checkerwork 2. The combustion products pass through the furnace as previously described and are passed out through the checkerwork 1.

The heating cycle is then followed by the endothermic alteration cycle which is also reversed in direction; steam and vaporized petroleum naphtha being introduced through the checkerwork 2 and passing through the furnace to exhaust through the checkerwork 1. The direction of flow of the heating cycle and the endothermic alteration cycle is continuously reversed at 2-minute intervals to effect the cracking of petroleum naphtha.

The construction of the combustion chamber 4 and baffle means provide an extended path for the air passing through the combustion chamber, and this ensures an improved mixing of the fuel and combustion air. This improved mixing results in a corresponding improvement in the combustion of the fuel which allows a uniform temperature to be attained in the furnace and reduces the risk of damage to the furnace refractory materials caused by temperature high spots in the furnace.

In the process of the invention the fuel/air mixture is effectively burnt in two stages, namely a first stage in which more than 80 percent of the fuel is ejected into the airstream, followed by a second stage in which the remaining proportion of the fuel is fed to the airstream. This provides a weak combustible mixture in the first stage which results in efficient combustion with a comparatively low temperature, followed by a second booster stage during which the remainder of the fuel is ejected. It is found that by using this technique it is possible to obtain efficient mixing of the fuel and air by means of the extended-path combustion chamber, combined with a lower flame temperature than has hitherto been obtained by the two-stage combustion technique. This invention therefore provides the advantages of efficient mixing but reduces the risk of damaging the furnace refractory materials by high temperatures.

We claim:

1. A method of operating a refractory regenerative furnace having two heat-regenerative masses each having a plurality of flue passageways extending therethrough and a combustion chamber located between the heat-regenerative masses whereby gaseous material first passes through the flue passageways of one heat-regenerative mass and then through the flue passageways of the other heat-regenerative mass, said combustion chamber being provided with baffle means interposed in the path of flow from one heat-regenerative mass to the other whereby a stream of gaseous material passing through the combustion chamber is constrained to flow through an extended path, wherein more than 80 percent by weight of the fuel for combustion is introduced into the combustion chamber upstream of the baffle means and the remainder of the fuel is introduced into the combustion chamber downstream of the baffle means.

2. A method as claimed in claim 1, wherein between 85 and 95 percent by weight of the fuel is introduced into the combustion chamber upstream of the baffle means.

* * * * *